July 16, 1935. H. W. KRAG 2,008,023
CLUTCH
Filed Jan. 2, 1935 2 Sheets-Sheet 1
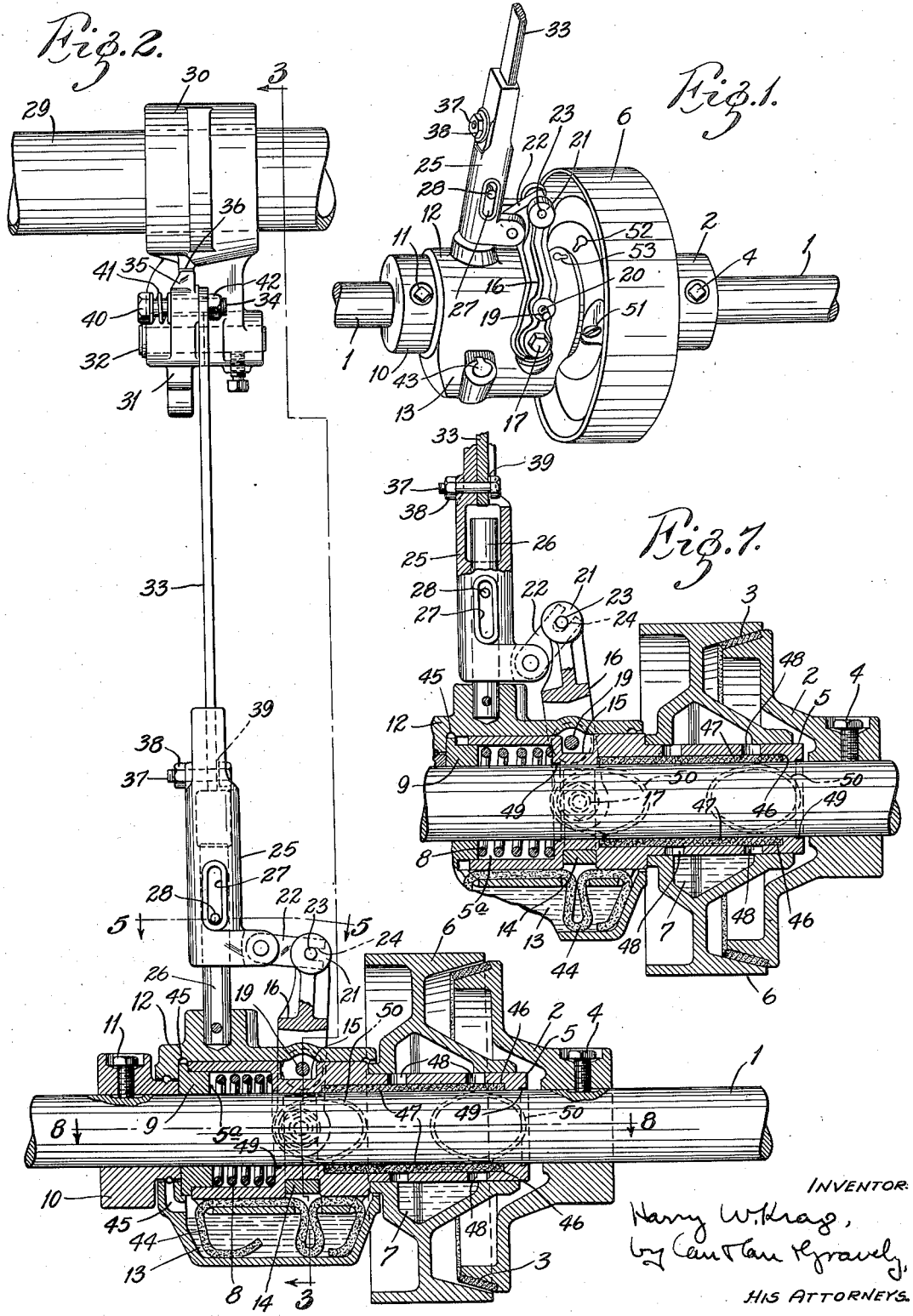
INVENTOR.
Harry W. Krag,
by Cantlan & Gravely
HIS ATTORNEYS.

July 16, 1935.  H. W. KRAG  2,008,023
CLUTCH
Filed Jan. 2, 1935  2 Sheets-Sheet 2
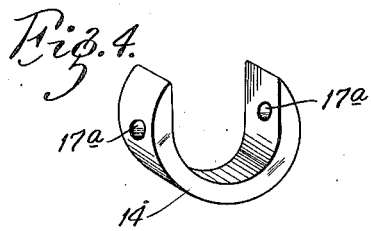
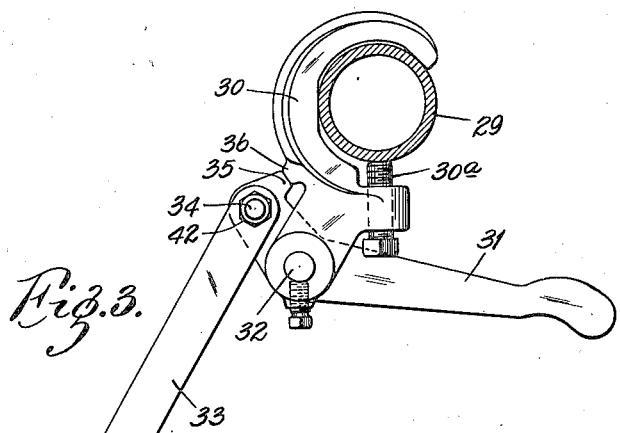
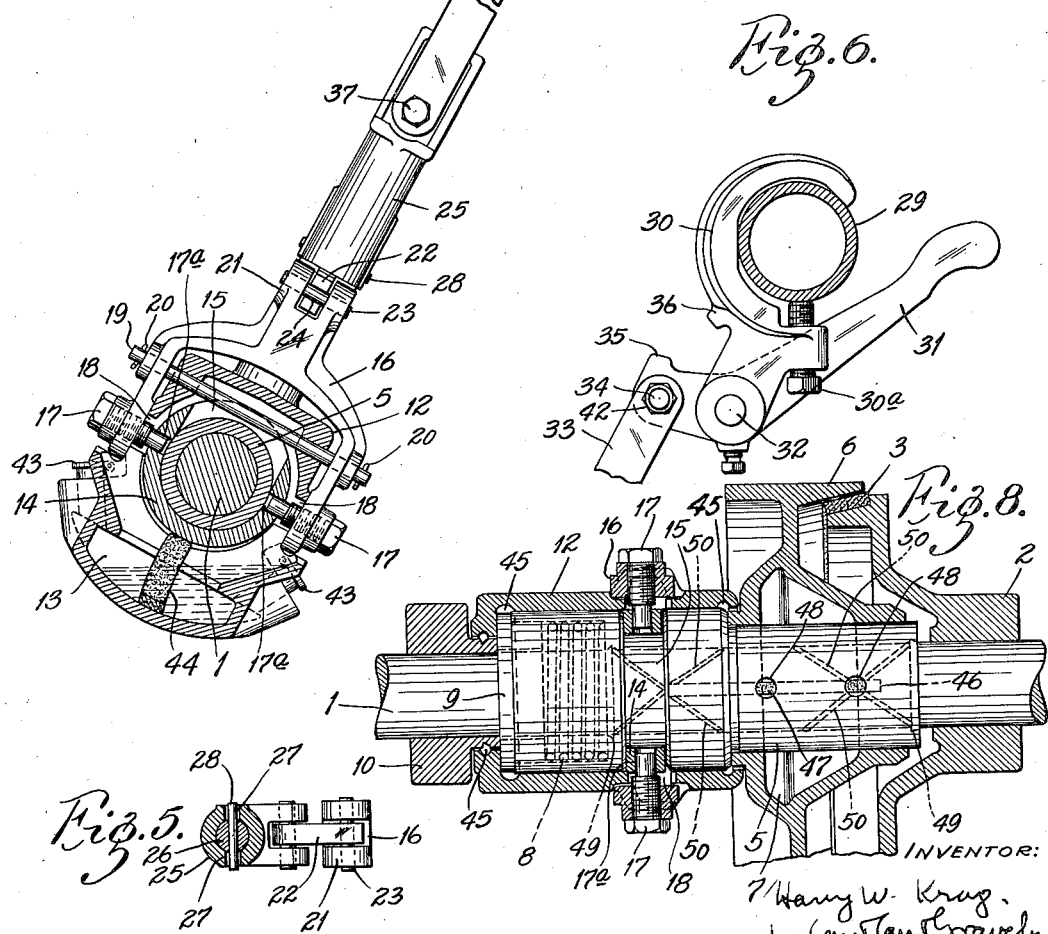
INVENTOR:
Harry W. Krag.
by Constant Gravely,
HIS ATTORNEYS.

Patented July 16, 1935

2,008,023

UNITED STATES PATENT OFFICE 2,008,023

CLUTCH

Harry W. Krag, St. Louis, Mo., assignor to American Shoe Machinery and Tool Company, St. Louis, Mo., a corporation of Missouri Application January 2, 1935, Serial No. 10

9 Claims. (Cl. 192—66)

The invention relates generally to friction clutches having a driving and a driven member mounted on a rotatable shaft and particularly to the means for engaging and disengaging the driven member.

One object of the invention is to provide a simple, compact and efficient clutch operating mechanism in which the rotatable parts are enclosed within a housing permitting the operating parts therein to run in a bath of oil. Another object is to effectively guard the operating parts. Another object is to quickly stop the driven member when disengaged. Another object is to normally limit the travel of the manual control to prevent excess frictional load on the rotatable parts.

In the accompanying drawings, wherein like symbols refer to like parts,

Fig. 1 is an assembly view in elevation of the clutch mechanism mounted on a rotatable shaft showing the position of the clutch pulley when filling oil well to proper level, Fig. 2 is a longitudinal sectional view showing the engaging means, the operating means, the driven member, the driving member and the retaining collar in non-driving relation, Fig. 3 is a view on the line 3—3 in Fig. 2 and shows the manual control, Fig. 4 is a detail perspective view of a clip forming part of the actuating mechanism, Fig. 5 is a sectional view on the line 5—5 in Fig. 2, Fig. 6 is a detail elevation showing a different position of the manual control shown in Fig. 3, Fig. 7 is a sectional view similar to Fig. 2, showing the parts in driving relation; and Fig. 8 is a sectional view on the line 8—8 of Fig. 2.

A rotatable shaft 1 has a driving member 2 thereon, on which is a frictional facing 3. The driver 2 is held on said shaft 1 by a set screw 4. A sleeve 5 is pressed into a pulley or driven member 6 and forms an extended hub portion thereof. Said pulley has a chamber 7 therein forming an oil well. The sleeve 5 has a counterbore 5a in which is a spring 8. A pressure collar 9 is interposed between said spring 8 and an abutment collar 10 secured to said shaft by suitable fastening means as a screw 11. A housing 12 is slidably journaled on sleeve 5 and has an oil well 13 therein. As hereinafter described, suitable means are provided for filling the oil well to proper level (Fig. 1) and distributing the oil over the bearing area and rotating parts and returning the surplus oil to the wall 13 (Fig. 2).

A clip 14 of U-shape (Figs. 2, 3 and 4) is disposed in a groove 15 in said sleeve 5, with its opening at the top to facilitate assembly. A yoke 16 straddles said housing and is secured to said clip by screws 17 in holes 17a in said clip and passing through apertures 18 in said housing 12 that are large enough to permit limited transverse movement of said yoke ends. Said yoke 16 is fulcrumed on a pin 19 supported by the housing 12 and extending through the groove 15 in the extended hub portion 5 of the driven member 6. Said pin 19 is retained by cotter pins 20 at the ends thereof. The end 21 of the yoke 16 is bifurcated permitting a link 22 to slide therein, a pin 23 at the bifurcated end of the yoke 16 cooperating with a slot 24 in the end of the link 22. Said link 22 is pivotally connected to a rod end or slide member 25. Said rod end 25 is mounted on a post 26 which is suitably fastened in the housing 12. The rod end 25 has a slot 27 co-acting with a stop pin 28 in the post 26. Thus the rod end is permitted limited sliding movement on said post 26.

Referring to Fig. 3, 29 is a part of the particular machine on which the clutch is used and has a bracket 30 mounted thereon. An operating hand lever 31 is pivotally mounted on said bracket at 32 and is connected to a clutch rod 33 at 34. Movement of the hand lever 31 is limited by a stop 35 on the hand lever and an abutment 36 on the bracket 30 for the stop 35. The clutch rod 33 is loosely connected to the rod end 25 by a screw 37 threaded into the rod end 25 and locked with a nut 38 leaving play at 39 permitting limited transverse movement of clutch mechanism. The end of the rod end 25 is recessed to receive the rod 33. A screw 34 connects said hand lever 31 and said clutch rod 33. Between the head 40 of the screw 34 and the hand lever 31 is a spring 41. The clutch rod 33 is threaded to receive the screw 34 which is screwed into compress spring 41 and locked with a nut 42, to hold the clutch rod 33 in yielding engagement with the cooperating face of the hand lever 31.

The housing 12 is provided with oil cups 43 for filling the oil well 13. The oil is put into the front oil cup as the mechanism is mounted on the machine. The height of the cup is below the bearing level of the sleeve 5 which prevents filling the housing to a point where the oil would run out of the end of the housing at the pulley end and drip on the pulley and belt.

The oil is fed to the sleeve 5 by a wick 44 and it is carried around the sleeve when the clutch is engaged, lubricating the clip 14 and the pressure collar 9. The surplus oil is returned to the oil well by collecting grooves 45, which drain to the well.

In the shaft bearing of sleeve 5 are two recesses 46, (Fig. 2), for felt oil pads 47. These oil pads are fed with oil from the well 7 through holes 48 which are so spaced that the centers are approximately coincident with the side walls of the well. At each end of the bearing are oil collecting grooves 49. Intersecting these collecting grooves at each end are two elongated ring grooves 50 opposed and crossing each other at the oil pad recess as shown in Fig. 8.

The function of the ring grooves 50 intersecting the oil collecting grooves 49 at the ends of the bearing is to return the surplus oil that works out to the collecting grooves.

The pulley is oiled by means of one of two plugs 51 as shown in Fig. 1. As shown in Fig. 1, the pulley is brought to a definite position in relation to the housing indicated by marks 52 and 53 on the pulley 6 and the housing 12, respectively. In this position the front oil plug 51 will be below the bottom of the shaft and prevent flooding the bearing. The oil pads receive oil each time the clutch is disengaged. One or the other is always in the feeding area as the oil runs down the sides of the well when subsiding from the centrifugal force which held it at the periphery of the well when the clutch was engaged.

The purpose of the second oil plug 51 in the pulley and the second oil cup 43 in the housing is to permit the mechanism to be mounted on the shaft in opposed position to that shown in the drawings with the same function as described.

*Operation*

When the clutch is disengaged, the hand lever 31 is down as shown in Fig. 3 and the corresponding position of the rod end 25 is up. The link 22 has a toggle action and in the disengaged position shown has passed over center or the point of maximum extension of the link and the movement imparted to yoke 16 has moved the sleeve 5 with pulley attached toward the housing 12, necessarily compressing spring 8 in this movement. In this position of the clutch, the bottom of the slot 27 in the rod end 25 is engaged with the stop pin 28 in the post 26 on the housing 12 and thus limits the movement of the parts to the amount required to disengage the clutch. When the slot 27 is thus engaged with the underside of the stop pin 28, the stop 35 on the hand lever 31 engages the abutment 36 on the bracket 30 and thus prevents further movement of said hand lever in a direction that would pull the housing 12 transversely of the shaft, and thus cause side strain and unnecessary friction between said shaft and the parts in which it rotates.

In the arrangement illustrated, the rod 33 is made in one piece with the distance between 37 and 34 a predetermined length. Thus the rod 33 serves as a link connecting the hand lever 31 and the rod end 25 and preventing housing 12 from rotating. In setting the hand lever 31, the screw 30a of the bracket 30 is released, the clutch rod is then pulled up until the lower end of the slot 27 engages the pin 28. In this position the toggle link 22 has passed over center, the action compressing spring 8. The distance the link has passed over center is sufficient to cause the rod end 25 and rod 33 to normally retain the disengaged position. The bracket 30 is now set so that the abutment 36 engages the stop 35 on the hand lever 31 after which it is locked with screw 30a.

When the clutch is disengaged, as shown in Fig. 2, the spring 41 pulls the clutch rod 33 and the parts associated with the lower end thereof in the direction of the set collar 10, thereby holding the driven member 6 away from the driver 2. The spring 41 also acts as a dampener to check vibration in the loosely connected clutch rod 33.

To engage the clutch, the hand lever 31 is raised to the position shown in Fig. 6, the member 29 limiting the upward motion. The corresponding positions of rod end 25 and yoke 16 are shown in Fig. 7. The axial movement of the rod end 25 imparts a movement to the link 22 in excess of the movement of the yoke 16, hence the purpose of the slot 24 which maintains engagement of link and pin 23 while the pressure surface of the slot moves away from the pin is to permit engagement of the clutch and to provide for greater movement of yoke 16 in case of wear. When the hand lever and rod end are in the position shown in Fig. 6, the yoke 16 is released and the spring 8 then exerts its pressure against the driver 2 and the driven member or pulley 6 and the sleeve 5, the spring 8, and the pressure collar 9 all revolve with the shaft, and the housing 12 with clip 14 float on sleeve 5 and are prevented from rotating by the clutch rod. During the engaged period, the housing 12 and clip 14 are lubricated from the oil well provided in the housing, all surplus oil returning to the oil well.

When the clutch is disengaged the spring 8 is compressed, the driven member is influenced away from the driver and the sleeve 5 floats on the shaft supporting the housing in frictional engagement with clip 14. The sleeve 5 is lubricated from the oil well in the driven member or pulley. This oil well level is maintained as shown in Figs. 2 and 3 in which case the pulley is brought to definite position in relation to the housing so that the oil plug will be below the bottom of the shaft and prevent flooding the bearing. As above described, suitable provisions are made for distributing the oil over the surface of the sleeve bearing.

The foregoing description is the embodiment of a clutch mechanism adapted to be operated with very little attention. All of the running parts are enclosed and the construction permits constant lubrication. It is particularly adaptable for use in applications where there is considerable dust or abrasive material from sanding wheels that might fall on unprotected running parts and cause excessive wear and short life to the mechanism. The clutch mechanism may be transposed on the shaft without affecting the engaged or disengaged positions of the hand lever.

Obviously numerous changes may be made without departing from the invention and I do not wish to be limited to the precise construction shown.

What I claim is:

1. A clutch mechanism comprising a rotatable shaft, a driving member and a spaced stop collar secured thereto, a driven member rotatably mounted on said shaft with limited axial movement between said driving member and said stop collar, a spring within said driven member to urge same into frictional engagement with the driving member, a housing rotatably mounted on an extended hub of the driven member, a yoke lever pivotally mounted intermediate its ends on said housing, and a U-clip mounted in an annular groove provided therefor in the extended hub of the driven member, said yoke lever being connected to said clip at one of its ends and to actuating means at the other end to engage or disengage said clutch.

2. A clutch mechanism comprising a rotatable shaft, a driving member and a spaced stop collar secured thereto, a driven member rotatably mounted on said shaft with limited axial movement between said driving member and said stop collar, a spring within said driven member to urge same into frictional engagement with the driving member, a housing rotatably mounted on an extended hub of the driven member, a yoke lever pivotally mounted intermediate its ends on said housing, and a U-clip mounted in an annular groove provided therefor in the extended hub of the driven member, said yoke lever being connected to said clip at one of its ends and to actuating means at the other end to engage or disengage said clutch, said actuating means comprising a post secured to said housing, a rod end slidably mounted on said post and a link pivotally connected to said rod end and adapted to engage the other end of said yoke, said sliding movement of said rod end actuating said yoke to engage or disengage said clutch.

3. A clutch mechanism comprising a rotatable shaft, a driving member and a spaced stop collar secured thereto, a driven member rotatably mounted on said shaft with limited axial movement between said driving member and said stop collar, a spring within said driven member to urge same into frictional engagement with the driving member, a housing rotatably mounted on an extended hub of the driven member, a yoke lever pivotally mounted intermediate its ends on said housing, and a U-clip mounted in an annular groove provided therefor in the extended hub of the driven member, said yoke lever being connected to said clip at one of its ends and to actuating means at the other end to engage or disengage said clutch, said actuating means comprising a post secured to said housing, a rod end slidably mounted on said post and a link pivotally connected to said rod end and adapted to engage the other end of said yoke, said sliding movement of said rod end actuating said yoke to engage or disengage said clutch, the movement in one direction limited to pass over the point of maximum extension of said link and movement in the other direction retracting said link a distance in excess of the normal travel of said yoke.

4. A clutch mechanism comprising a rotatable shaft, a driving member and a spaced stop collar secured to said shaft, a driven member rotatably mounted on said shaft adjacent to said driving member and having an extended hub portion projecting from the side remote from said driving member, said hub portion having a peripheral groove, a pulley wheel mounted on said driven member and having a portion adapted for frictional engagement with said driving member, a housing rotatably mounted on said hub portion, a U-clip mounted in said groove of said hub portion with its opening uppermost, a yoke lever disposed with its arms straddling said housing and pivotally secured thereto by means of a pin extending through said groove in said hub portion, the ends of said arms being secured to said clip, and means for actuating said yoke.

5. A clutch mechanism comprising a rotatable shaft, a driving member and a spaced stop collar secured to said shaft, a driven member rotatably mounted on said shaft adjacent to said driving member and having an extended hub portion projecting from the side remote from said driving member, said hub portion having a peripheral groove, a spring in said driven member urging it towards engaged position, a pulley wheel mounted on said driven member and having a portion adapted for frictional engagement with said driving member, a housing rotatably mounted on said hub portion, a U-clip mounted in said groove of said hub portion with its opening uppermost, a yoke lever disposed with its arms straddling said housing and pivotally secured thereto by means of a pin extending through said groove in said hub portion, the ends of said arms being secured to said clip, a post mounted on said housing, a rod end slidably mounted on said post, means limiting the sliding movement of said rod end, a link operatively connecting said rod end and said yoke lever, a bracket, a hand lever pivotally secured to said bracket, a link loosely connected at one end to said rod end, a screw pivotally connecting the other end of said link with said hand lever and a spring interposed between the head of said screw and said hand lever.

6. A clutch mechanism comprising a rotatable shaft, a driving member and a spaced stop collar secured to said shaft, a driven member rotatably mounted on said shaft adjacent to said driving member and having an extended hub portion projecting from the side remote from said driving member, said hub portion having a peripheral groove, a spring in said driven member urging it into engaged position, a pulley wheel mounted on said driven member and having a portion adapted for frictional engagement with said driving member, a housing rotatably mounted on said hub portion, a U-clip mounted in said groove of said hub portion with its opening uppermost, a yoke lever disposed with its arms straddling said housing and pivotally secured thereto by means of a pin extending through said groove in said hub portion, the ends of said arms being secured to said clip, a post mounted on said housing, a rod end slidably mounted on said post, means limiting the sliding movement of said rod end, a link pivotally secured at one end to said rod end, the other end of said link having a recess therein, a pin secured to the stem of said yoke lever and fitting in said recess, a bracket, a hand lever pivotally secured to said bracket, and a link connecting said rod end and said hand lever.

7. A clutch mechanism comprising a rotatable shaft, a driving member and a spaced stop collar secured to said shaft, a driven member rotatably mounted on said shaft adjacent to said driving member and having an extended hub portion projecting from the side remote from said driving member, said hub portion having a peripheral groove, a spring in said driven member urging it into engaged position with said driving member, a housing rotatably mounted on said hub portion and means for causing relative axial movement of said hub portion and said housing to engage and disengage said clutch, said housing having a lubricant well therein, a wick dipping into said well and extending along the outer surface of said extended hub portion.

8. A clutch mechanism comprising a rotatable shaft, a driving member and a spaced stop collar secured to said shaft, a driven member rotatably mounted on said shaft adjacent to said driving member and having an extended hub portion projecting from the side remote from said driving member, said hub portion having a peripheral groove, a spring in said driven member urging it into engaged position, a pulley wheel mounted on said driven member and having a portion adapted for frictional engagement with said driving member, a housing rotatably mounted on said hub portion, said driven member having a bearing sleeve portion and an enlarged body portion containing a lubricant well, said bearing portion having longitudinal grooves in its inner wall, and pads in said grooves, said bearing portion having openings permitting lubricant to pass from said well onto said pads for lubricating said shaft.

9. A clutch mechanism comprising a rotatable shaft, a driving member and a spaced stop collar secured to said shaft, a driven member rotatably mounted on said shaft adjacent to said driving member and having an extended hub portion projecting from the side remote from said driving member, said hub portion having a peripheral groove, a spring in said driven member urging it into engaged position, a pulley wheel mounted on said driven member and having a portion adapted for frictional engagement with said driving member, a housing rotatably mounted on said hub portion, said driven member having a bearing sleeve portion and an enlarged body portion containing a lubricant well, said bearing portion having longitudinal grooves in its inner wall, and pads in said grooves, said bearing portion having openings permitting lubricant to pass from said well onto said pads for lubricating said shaft, said bearing portion having lubricant retaining grooves in its inner periphery at each end and said shaft having pairs of angularly disposed annular grooves, intersecting adjacent to said pads.

HARRY W. KRAG.